United States Patent [19]

Peuterbaugh

[11] Patent Number: 5,232,317
[45] Date of Patent: Aug. 3, 1993

[54] INDEXABLE SPHERICAL SEAT CUTTER

[75] Inventor: Bruce G. Peuterbaugh, Mt. Clemens, Mich.

[73] Assignee: J. P. Tool, Inc., Warren, Mich.

[21] Appl. No.: 938,271

[22] Filed: Aug. 31, 1992

Related U.S. Application Data

[63] Continuation of Ser. No. 733,299, Jul. 22, 1991, abandoned.

[51] Int. Cl.[5] .................................................. B23C 3/02
[52] U.S. Cl. ....................................... 407/40; 408/82; 407/107
[58] Field of Search ............... 82/128, 172; 407/40, 407/42, 48, 54, 62, 64, 65, 107, 111; 408/79–82, 83.5, 54, 203.5, 707, 708; 409/140, 143, 199

[56] References Cited

U.S. PATENT DOCUMENTS

| | | | |
|---|---|---|---|
| 663,455 | 12/1900 | Muehlberg | 407/113 |
| 1,449,977 | 3/1923 | Filson | 82/172 |
| 1,838,520 | 12/1931 | Archer | 407/113 |
| 1,926,531 | 9/1933 | Graham | 407/113 |
| 2,989,800 | 6/1961 | Comly | 407/40 |
| 3,279,034 | 10/1966 | Kaiser | 407/113 |
| 3,701,187 | 10/1972 | Erkfritz | 407/113 |
| 4,061,076 | 12/1977 | Robertson | 407/49 |
| 4,072,083 | 2/1978 | Cesal | 408/54 |
| 4,252,480 | 2/1981 | Mizuno et al. | 407/54 |
| 4,294,565 | 10/1981 | Erkfritz | 407/113 |
| 4,309,132 | 1/1982 | Adamson et al. | 407/408 |
| 4,618,296 | 10/1986 | Allaire et al. | 407/54 |
| 4,692,070 | 9/1987 | Shikata | 407/62 |
| 4,743,144 | 5/1988 | Shikata | 407/48 |
| 4,927,303 | 5/1990 | Tsujimura et al. | 407/42 |
| 5,035,544 | 7/1991 | Ikenaga et al. | 407/48 |

FOREIGN PATENT DOCUMENTS 151705 11/1981 German Democratic Rep. ................................. 409/143

OTHER PUBLICATIONS

Photocopy of Drawing Having Approval Print Date of Jun. 7, 1990.

Primary Examiner—Steven C. Bishop
Attorney, Agent, or Firm—Basile and Hanlon

[57] ABSTRACT

A rotatable cutting tool for cutting a spherical seat carries a plurality of indexable cutting inserts at the front end of the cutter body. The inserts are located in pockets and retained in the pockets by respective retainer members mounted on the body and overlying the exposed face of the insert. A reduced diameter section at the rearward end of the cutter body is dimensional to be rotatably received in a bore extending through a plate-like hanger. A retainer plate is cooperable with headed cap screws projecting from the rear end of the reduced diameter section of the body to constitute a quick disconnect coupling for rapid mounting and dismounting of the cutter upon its hanger. The cutting edges of the inserts lie in respective axial planes offset forwardly, with respect to the direction of rotation of the tool, from the axis of rotation and angularly offset from each other by unequal angles.

18 Claims, 5 Drawing Sheets

INDEXABLE SPHERICAL SEAT CUTTER

RELATED APPLICATIONS

This application is a continuation of U.S. patent application Ser. No. 07/733,299 filed Jul. 22, 1991, now abandoned.

BACKGROUND OF THE INVENTION

The present invention is directed to rotary cutting tool for rough or finish a concave spherical seat coaxial with a bore through a workpiece in a mass production transfer line or a similar setting. One application to which the cutting tool of the present invention is especially well adapted is that of cutting spherical seats on the interior of an automotive differential case.

Indexable inserts employed on rotatable cutting tools for forming concave spherical recesses in workpieces have been utilized for many years, see, for example, Mizuno et al U.S. Pat. No. 4,252,480 and Allaire et al U.S. Pat. No. 4,618,296, for example.

Indexable cutting inserts of the type with which the present invention is concerned are typically formed, as disclosed in Mizuno et al U.S. Pat. No. 4,252,480, as a flat platelike cutting element having three like convexly curved cutting edges. The insert is seated in an open pocket with two sides of the insert engaged by side walls of the pocket which is formed in the cutter body with the cutting edge of the third side of the insert projecting outwardly from the body. When one cutting edge becomes worn, the insert is removed from the pocket and rotatably indexed so that the worn cutting edge is now located against a side wall of the pocket and a fresh cutting edge projects from the body. When all three cutting edges are worn, the cutting edges may be reground to restore their sharpness or, in applications where a fair degree of precision is required, may be discarded.

In a mass production transfer line or similar environment, the ability to rapidly change or replace tooling, such as worn cutters, is of paramount concern in that the shutting down of one machine on the line completely stops the flow of parts or workpieces along the line. This requires not only that the cutters be mounted upon the cutter body in a manner such that they can be rapidly indexed to replace a dulled cutting edge with a sharp cutting edge, but also that the entire cutting tool can be rapidly replaced so that the indexing can be performed on one tool while the machine is in operation with a second tool.

The replaceable or throwaway insert when indexed or replaced does not require a resetting of the cutter body location in relation to the workpiece as is the case with the conventional brazed insert which must be reset by way of machine spindle stop adjustment.

In addition to being mounted upon the cutting body in a manner accommodating rapid indexing, the locating and maintaining of the position of the cutting insert relative to the cutting body requires a high degree of precision. This latter requirement is not always compatible with rapid tool changing or indexing.

The present invention is especially directed to solutions of the problems referred to above.

SUMMARY OF THE INVENTION

A cutter embodying the present invention includes a cutter body which is generally symmetrical about a central longitudinally extending axis of rotation. In the particular application here disclosed, a central passage of non-circular cross section extends coaxially through the body to slidably receive a drive arbor of complementary non-circular cross section utilized to drive the cutter in rotation. The cutter body, when in use, is supported from a hanger having opposed flat side surfaces and a cutter body receiving bore extending through the hanger between the side surfaces. The cutter body is formed at its rear or non-cutting end with a rearwardly facing radial shoulder from which a reduced diameter section of the body projects coaxially of the axis. The reduced diameter section of the cutter body is of a diameter such as to be rotatably supported within the body receiving bore in the hanger. The axial extent of the reduced diameter section is substantially the same as or slightly greater than the thickness of the hanger body. A plurality of like headed cap screws threaded into the rear end of the reduced diameter section are received in circumferentially extending bayonet type slots in a flat retainer plate of a diameter greater than that of the body receiving bore in the hanger. When the retainer plate is operatively engaged with the screws, the hanger is slidably engaged on opposite sides by the retainer plate and radial shoulder on the body so that the cutter body can rotate freely relative to the hanger in axially fixed relationship to the hanger. This arrangement provides a quick disconnect coupling for rapidly dismounting or mounting the cutter upon the hanger. The hanger is employed to shift the cutter into and out of operating alignment with the workpiece to be operated upon by the cutter.

At its cutting end, the generally cylindrical cutter body is rounded to a generally hemispherical configuration of a radius approximately equal to that of the spherical surface to be cut by the cutter. A plurality of recesses extend axially into this latter end of the cutter at nearly symmetrically spaced locations about the cutter axis. The recesses define cutter insert receiving pockets for receiving a flat platelike multi-sided cutter insert, a three-sided insert being the typical choice. Each pocket has a wall surface lying in a general plane parallel to but slightly offset from a plane radial to the cutter axis and a pair of side walls of a height slightly less than the thickness of a cutting insert. In the case of a three-sided insert, two such side walls are provided in a generally V-shaped relationship to each other, the side edges of the cutting insert and of the side walls being of complementary curved configuration and so oriented that when a cutting insert is seated in the pocket, one of its side edges projects slightly outwardly beyond the curved cutting edge surface of the cutter body. The two side walls of the pocket and the corner at which the two side walls would intersect each other are relieved so that each of the two side edges of the cutter insert engaging the side walls contacts the side walls at only two spaced sections constituting roughly two thirds or less of the length of the edge and the corner of the insert between the last two side edges does not contact the cutter body at all.

The insert may be held in place by a conventional locking pin, in which case a clamping arm overlying the exposed face of the cutter and secured to the cutter body by a differential thread screw is employed to hold the insert firmly against the planar wall of the pocket.

Other objects and features of the invention will become apparent by reference to the following specification and to the drawings.

Figure 1:
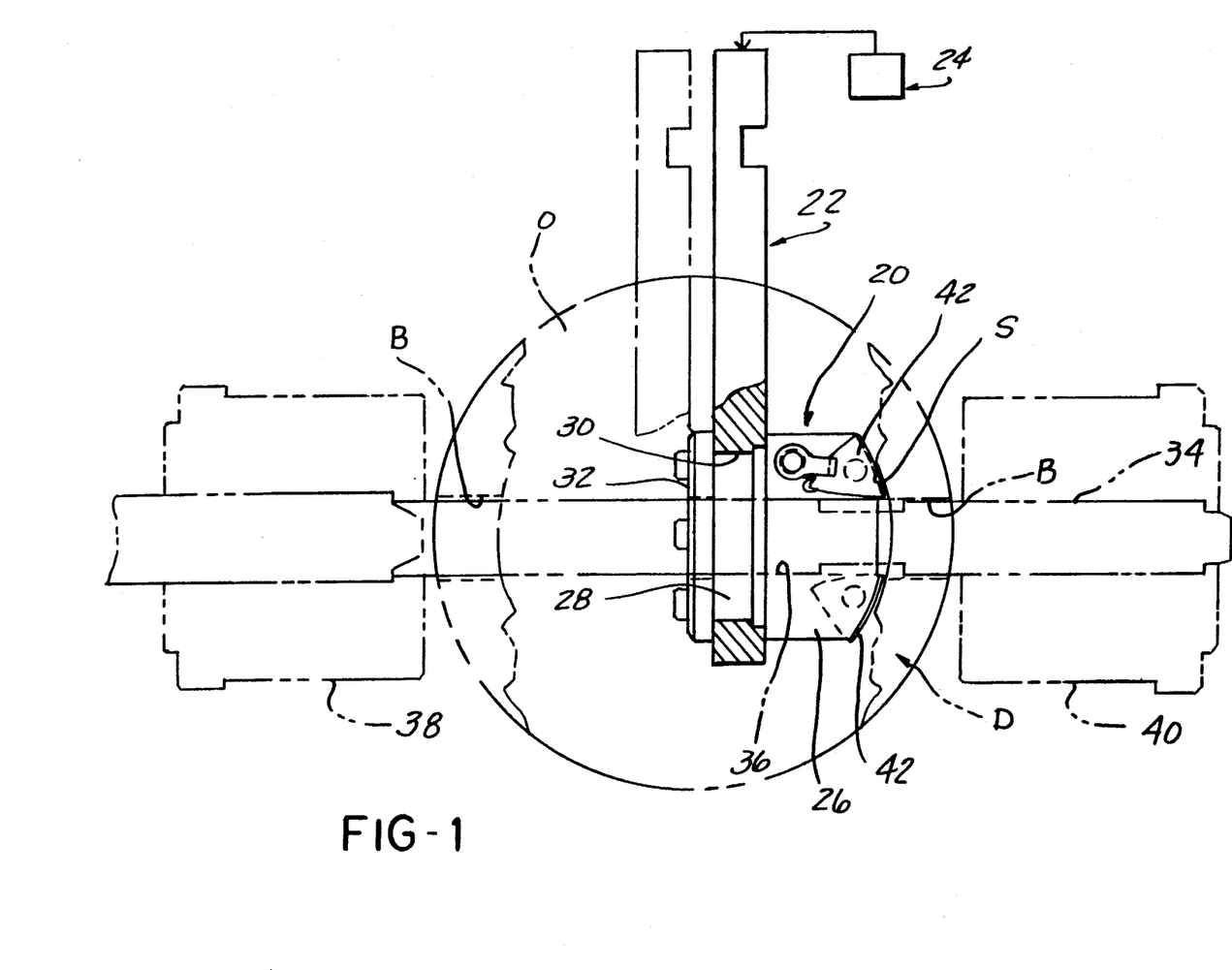
FIG. 1 is a side elevational view, with certain parts broken away or shown in section or indicated in broken line, of a cutter embodying the present invention positioned to cut a spherical seat in a workpiece.

Referring first to FIG. 1, a spherical seat cutter designated generally 20 embodying the present invention is disclosed as positioned to cut a spherical seat S on the interior of a differential casing designated generally D and shown in broken line in FIG. 1. During the cutting of the seat, the differential casing D will be fixedly held or supported by suitable structure, not shown. Suitable article handling apparatus, not shown, will be utilized to transfer the casing D to and from the position or work station shown in FIG. 1, which typically will be but one of several work stations to which the casing D is successively transferred, and at which various operations will be performed on the casing. In this instance, the direction of transfer may be assumed to be into the paper as viewed in FIG. 1, and the casing D, in addition to diametrically aligned bores B around which annular spherical seats S are cut, is also formed with a relatively large opening O at its top.

Cutter 20 is supported for rotation about its central axis by a hanger 22 which is in turn mounted upon a supporting device schematically indicated at 24 for vertical and horizontal movement. Cutter 20 includes a cutter body 26 formed with a reduced diameter section 28 at its rearward end which is rotatably supported within a bore 30 through hanger 22. A removable retainer plate 32 detachably coupled to the rearward end of the reduced diameter section 28 of the cutter body retains the cutter against axial movement relative to hanger 22.

In the tooling arrangement shown in FIG. 1, a single-ended cutter cuts the seat at one side of the differential case at the work station. An alternative arrangement can utilize a double-ended cutter—with a like second body portion 26 projecting from the opposite end of reduced diameter section 28—to cut first one and then the other seat. In this alternative arrangement, the hanger 22 is split on a horizontal axial plane through bore 30 as viewed in FIG. 1, the lower hanger portion being bolted to the upper to enable the double-ended cutter to be mounted upon or removed from the hanger.

As shown in FIG. 1, a rotatable drive arbor 34 projects through a central passage 36 through cutter 20 and is rotatably supported at opposite sides of differential casing D by stationary bearing assemblies indicated at 38 and 40. Arbor 34 is formed with splines engageable with complementary spline teeth formed within the central passage 36 through cutter 20. Arbor 34 is coupled to a suitable drive mechanism which is operable to drive the arbor in rotation and to also shift the arbor horizontally as viewed in FIG. 1. Rotation of the arbor, when coupled to cutter 20 as shown in FIG. 1, will drive the cutter in rotation, and a shoulder, not clearly seen in FIG. 1, on the arbor will engage the cutter to drive the cutter axially to the right as viewed in FIG. 1 in a feeding stroke.

Upon conclusion of the spherical seat cutting operation, the arbor 34 is withdrawn axially to the left as viewed in FIG. 1 clear of the left-hand side of the differential casing D with its end located in bearing 38. Hanger 22 is then manipulated to withdraw the cutter upwardly from the interior of the differential casing D through the relatively large opening O in the top of the casing. The differential casing may then be transferred to the next work station and a new casing D fed into position between the stationary bearings 38 and 40 and clamped in position. The hanger 22 is then manipulated by the device 24 to be inserted downwardly through the opening O in the new casing D, and when located approximately in the position shown in FIG. 1, the arbor 34 is then axially advanced to the right from its retracted position through the differential casing, cutter 20 and into bearing 40 in preparation to perform a spherical seat cutting operation on the new casing D. The cutting of the seat is performed by cutting inserts 42 detachably mounted upon cutter 20. Details of the cutter and insert are set forth below.

Figure 6:
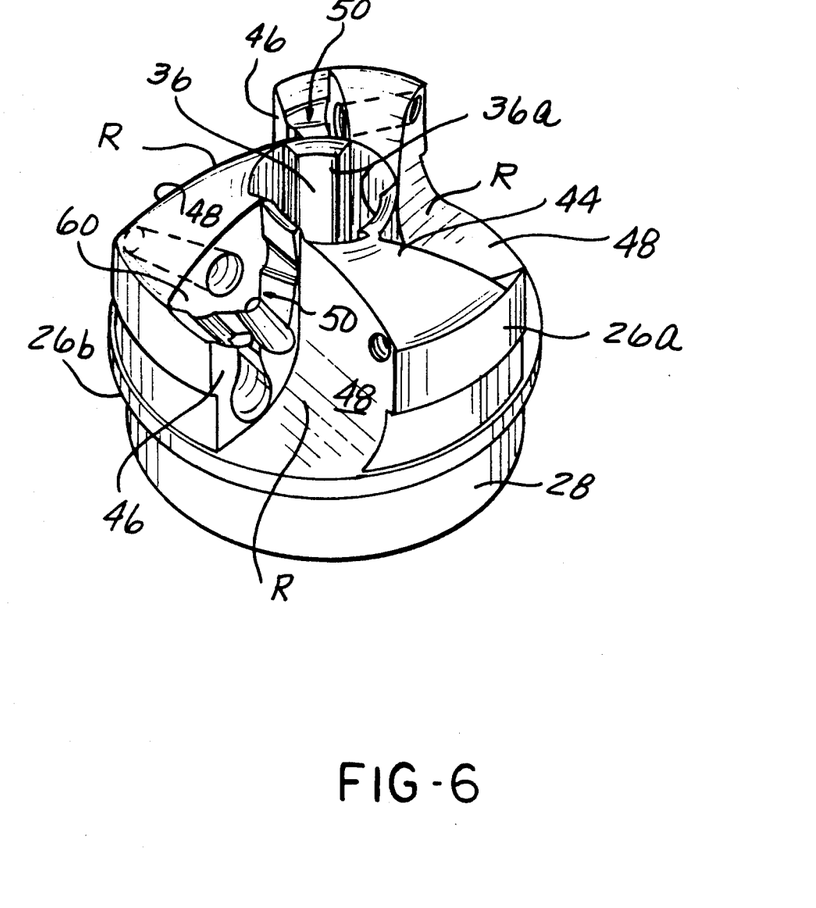
FIG. 6 is a perspective view of the cutter body.

Referring first to FIG. 6, cutter body 26, as set forth above includes a main body portion 26a having a reduced diameter portion 28 projecting rearwardly (to the left as viewed in FIG. 6) from the rearward face 26b of main portion 26a. The reduced diameter section 28 may include an intermediate stepped section 28a to prevent the cutter body from being mounted into the wrong side of the hanger 22. The front (right-hand end as viewed in FIG. 7) or cutting end of the cutter body 26 is spherically rounded as at 44 to a relatively large radius which substantially corresponds to the radius of the spherical seat which is to be cut by the cutter. A central passage 36 extends axially through body 26 from end to end, the passage 36 having a non-circular cross section matched to that of the drive arbor 34 so that the arbor may be rotatively coupled to the cutter body. In the particular form shown in the drawing, passage 36 through the cutter body and the arbor 34 are formed with meshing splines 36a. Alternatively, for example, passage 36 and drive arbor 34 might be formed with a square or other non-circular transverse cross section.

Figures 2, 3:
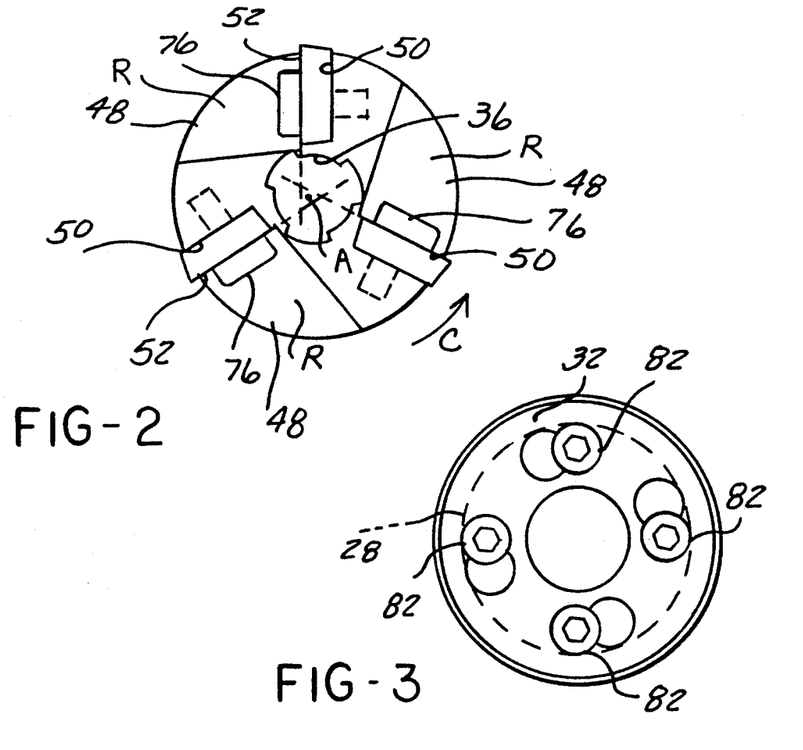
FIG. 2 is a front end view of the cutter of FIG. 1.
FIG. 3 is a rear end view of the cutter of FIG. 1.

Referring to FIG. 2, three insert receiving pockets 50 are formed in the cutting end of body 26 at locations substantially, but not exactly, uniformly spaced about the central axis of the body. The slight non-uniform spacing avoids harmonic vibrations during operation. For example, where there are three insert receiving pockets 50 as shown in the drawings, rather than being spaced 120° apart about the axis A of the cutter body, the insert receiving pockets might be angularly spaced from one another by angles of 118°, 120° and 122°. Each insert receiving pockets 50 is defined, see particularly FIGS. 4 and 5, by a flat wall 46 and a concavely curved wall 48. The flat walls 46 of the respective insert receiving pockets 50 lie in general planes which are parallel to, but slightly offset from, a radial plane containing the central axis of the cutter body, as best seen in FIG. 2. When viewed axially of the body, as in FIG. 2, the general planes of the respective surfaces 46 intersect each other to define a substantially equal sided polygon whose center is coincident with the central axis A of the cutter body.

Figure 9:
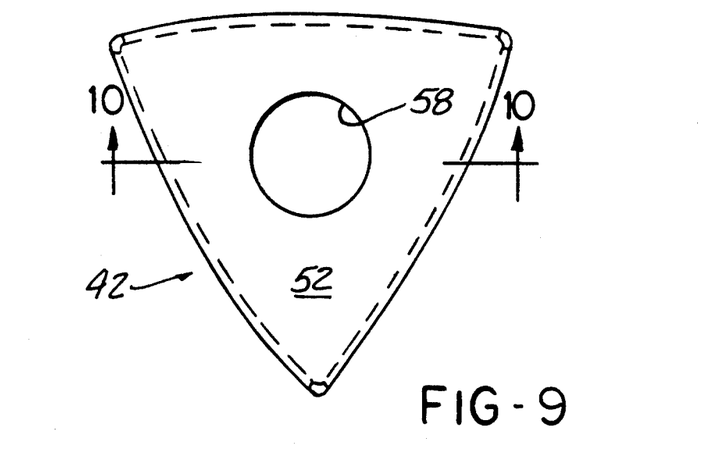
FIG. 9 is a front view of a cutter insert.
Figure 10:
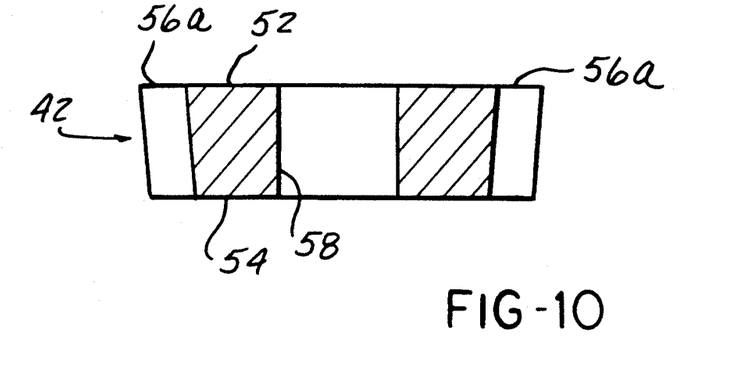
FIG. 10 is a cross sectional view of the cutter insert taken on line 10—10 of FIG. 9.

An insert receiving pocket 50 (FIG. 5) is cut into each flat recess wall 46 to receive an indexable cutting insert 42. In that the shape of the insert receiving pocket 50 is primarily determined by the shape of the cutting insert which is to be received within it, preference may be had to FIGS. 8 and 9 which show details of a three-sided insert utilized by the cutter. As best seen in FIGS. 9 and 10, cutting insert 42 is formed from a flat plate of suitable material with flat front and rear faces, 52, 54 respectively. As viewed from the front or rear, insert 42 is formed with three like side edges 56 in a general arrangement which might be best described as an equilateral triangle with convexly curved sides. The radius of curvature of the side edges 56 is equal to the radius of curvature of the spherical seat to be cut, the side edges are formed with an inclination or a rake (see FIG. 10) such that the front face 52 is slightly larger than rear face 54. The insert is intended for so-called "stand up" mounting in its pocket 50, and the actual cutting edge of the insert is defined at the intersection 56a of each side edge 56 of the insert with front face 52. A central bore 58 is formed through the center of the insert.

Figure 4:
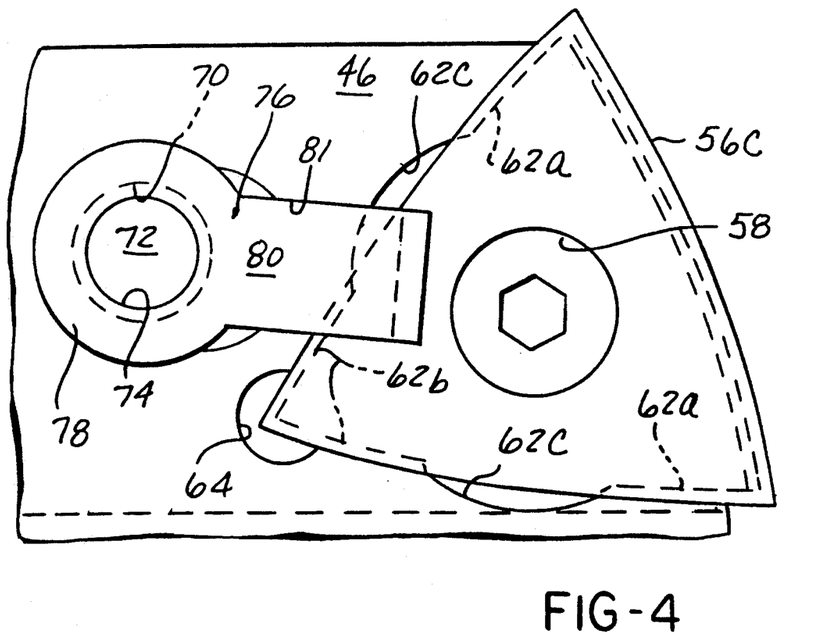
FIG. 4 is an enlarged side elevational view of a portion of the cutter of FIG. 1 showing a cutter insert in place.
Figure 5:
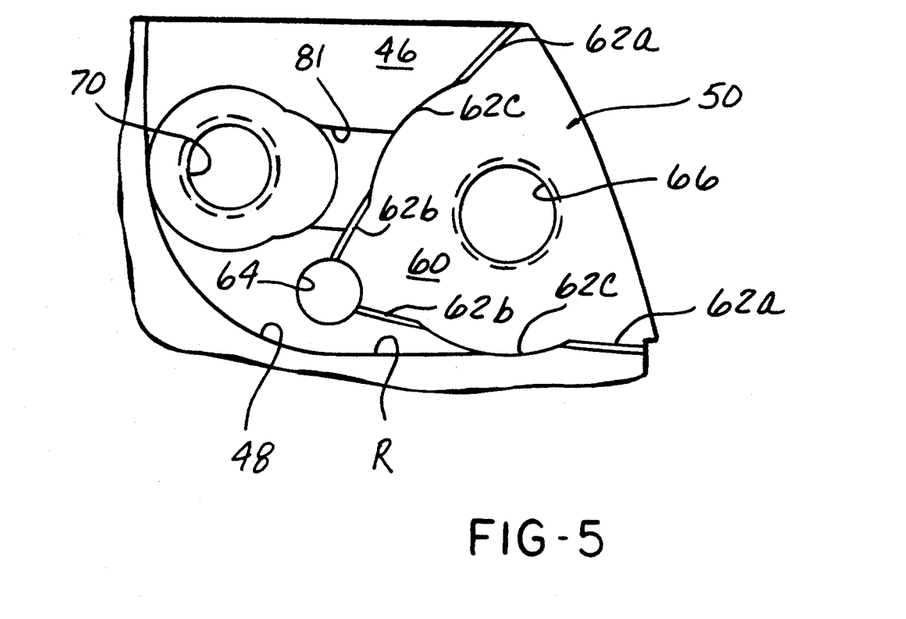
FIG. 5 is an enlarged view similar to FIG. 4 with the cutter insert and retainer removed showing details of the insert receiving pocket.

Returning now to FIG. 5, the pocket 50 is recessed into wall 46 to a flat bottom 60 lying in a general plane parallel to, but offset from a radial plane containing axis A (FIG. 2). The depth of the pocket is preferably slightly less than the thickness of an insert 42 and the bottom surface 60 of the pocket 50 is so located relative to the cutter axis A (FIG. 2) that the plane of the front face 52 of a cutter insert, when mounted in a pocket 50, passes forwardly of axis A, this relationship resulting in a shearing action as the cutter edge rotates into the work. Pocket 50 is formed with side walls each of which includes raked or inclined sections 62a and 62b accurately matched in curvature and inclination to the side edges 56 of an insert, the two side walls of the pocket being congruent to any two adjacent sides of an insert 42. The portions 62a and 62b of each side wall of the pocket 50 are separated from each other by a concavely curved wall section 62c of a radius smaller than that of the wall section 62a and 62b to provide a relief recess which extends for approximately one third or more of the length of the side wall, and the adjacent ends of the two side walls of the recess terminate in a bore 64 which provides a relief at the corner of the pocket. The presence of the bore 64 facilitates the machining of the adjacent ends of adjacent side walls of pocket 50, while the relief sections 62c similarly make it more convenient to achieve a precise fit between the side surfaces 56 of an insert and the side walls 62a-62b of the pocket and assure that a side edge of the insert contacts the pocket wall at two points. As indicated in FIG. 4, the side walls 62a-62b of the respective pocket sides are so located relative to each other than when an insert 42 is seated in the pocket, one edge 56c will project outwardly beyond the curved end surface 44 of the cutter body to constitute the active cutting edge of the insert.

A tapped bore 66 extends inwardly of the body from the bottom surface 60 of the pocket at a location such as to be coaxial with the bore 58 of the insert 42 when the insert is seated in the pocket. Bores 58 and 66 are provided to accommodate a locating or locking pin utilized to mount an insert 42 in the pocket 50. Several forms of such pins or screws are commercially available for this purpose, for purposes of the present application, it may be assumed that a locking pin which exerts a camming action urging the insert toward bore 64 is employed.

A second tapped bore 70 extends inwardly of each wall 46 of a recess, the axis of bore 70 extending perpendicular to the general plane of bottom 60 of the associated 9 pocket 50. Referring now to FIG. 4, tapped bore 70 threadably receives one end of a differential screw 72 whose opposite or outer end is threadably received within a tapped bore 74 in a retainer member designated generally 76. Retainer 76 is a flat platelike member having an annular main body portion 78 concentric with bore 74 and an integral radially projecting retainer arm 80 which can be located in overlying relationship with the front face 52 of an insert 42 seated in the adjacent pocket. Arm 80 is received within a slot 81 in wall 46 to lock retainer 76 against rotation when screw 72 is rotated. The differential screw 72 enables the rapid clamping or releasing of retaining arm 80 against the front face of the insert to firmly retain the insert in face to face contact with the bottom 60 of the insert receiving pocket 50 against any outward wedging action exerted by the inclined or raked insert edges and pocket side walls.

Figure 7:
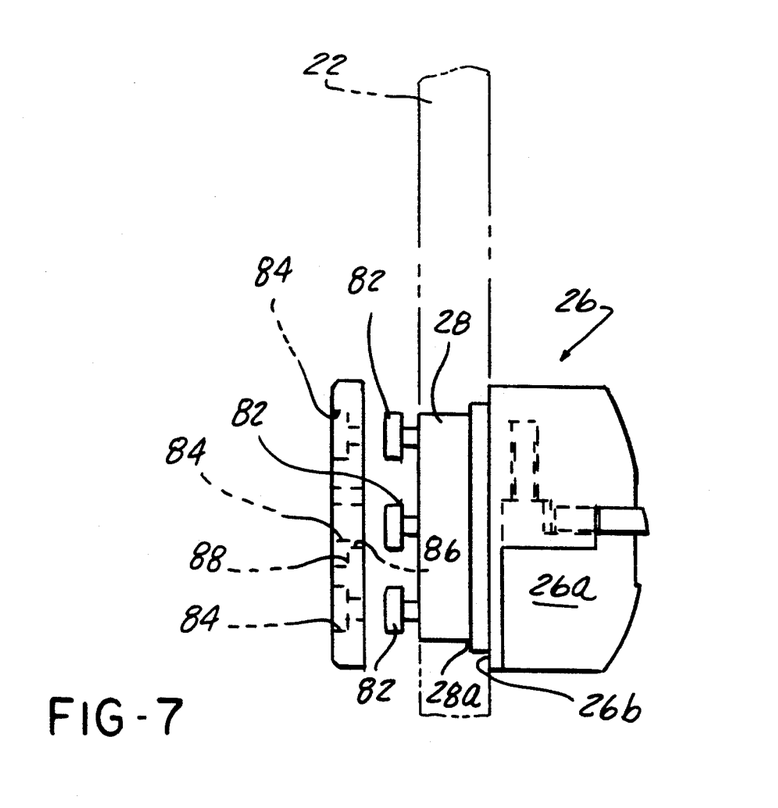
FIG. 7 is a side elevational view showing the cutter body and retainer plate separated from each other.

Referring now particularly to FIGS. 3 and 7, four socket headed cap screws 82 are threadably received in the rearward end of reduced diameter section 28 of the cutter body and are set with their heads spaced, as best shown in FIG. 7, rearwardly from the rearward end of the reduced diameter section 28. Screws 82 are located at uniformly spaced positions on a bolt circle concentric with the axis of rotation of cutter body 26.

Figure 8:
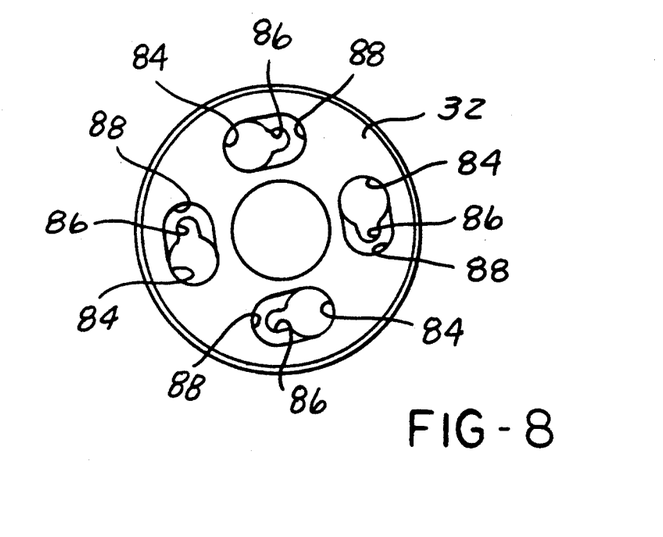
FIG. 8 is a rear view of the retainer plate.

As best seen in FIG. 8, retainer plate 32 is formed with four through bores 84 of a diameter large enough to freely pass the head of a cap screw 82, the bores 84 being centered on a bolt circle of the same diameter as that of screws 82. A curved slot 86 which extends entirely through the retainer plate extends from each bore 84 along the bolt circle upon which the bores 84 are centered. The width of the curved slots 86 slightly exceeds the diameter of the shank portion of the cap screws 82. The rear face of retainer plate 32 is formed with a curved recess 88 extending from each bore 84, the width of the recess 88 being equal to the diameter of the bore 84 and the circumferential extent of the recess 88 extending along the same bolt circle upon which the bores 84 are centered. The bores 84, slots 86 and recesses 88 of retainer plate 32 cooperate with the headed cap screws 82 to provide a quick disconnect coupling for mounting or dismounting the cutter body 26 upon hanger 22. The cutter body shown in the drawings is intended for so-called right-hand rotation, that is, rotation in a counterclockwise direction as viewed in FIG. 2. The slots 86 and recesses 88 of the associated retainer plate thus extend in a clockwise direction from their respective bores 84 so that, when mounted upon the hanger, rotation of the cutter body tends to maintain the head and shank of the respective cap screws at the ends of slots 86 and recesses 88 remote from the associated bore 84.

From the foregoing, it is believed apparent that mounting of the seat cutter upon its hanger simply involves inserting the reduced diameter end 28 of cutter body 26 into the bore 30 through hanger 22 from the front side of the hanger and then moving retainer plate 32 to receive the rearwardly projecting heads of the respective cap screws 82 through bores 84 and then rotating the retainer plate relative to cutter body 26 to locate the heads of the respective screws at the blind end of the respective recesses 88 in the retainer plate. The screws are then tightened, the axial length of reduced diameter section 28 slopingly exceeds the thickness of hanger 22. The reduced diameter portion 28 of cutter body 26 is received within the hanger bore 30 with a sliding fit, and when retainer plate 32 is seated upon the cap screws 82, the axial spacing between the opposed faces of retainer plate 32 and the rearwardly facing shoulder on cutter body 20 is such as to slidably engage hanger 22 at its opposite sides. The cutter is thus free to rotate relative to hanger 22 about its central axis in fixed axial relationship to hanger 22.

Dismounting of a cutter from hanger 22 simply involves a reversal of the steps set forth above. It is believed apparent that mounting or dismounting of the cutter from the hanger is a simple manual operation which requires a minimum amount of time to accomplish.

In a production line environment where a workpiece is advanced successively to a series of work stations, and the shutting down of one station to change tooling necessarily idles all of the remaining stations on the line. It is thus common practice to periodically shut down the line so that tooling at several stations may be changed simultaneously. The tool of the present application may be rapidly changed simply by dismounting the cutter previously in use upon the hanger from the hanger and replacing it with a new cutter, a procedure which can be accomplished without the use of tools in a matter of a few seconds. The cutting inserts 42 on the cutter removed from the hanger may then be indexed upon the cutter body to expose a new cutting edge simply by loosening the differential screw 72 of each retainer 76 and shifting the retainer arm clear of the cutter, disengaging the locking pin from the cutter insert to enable the insert 42 to be lifted from the insert receiving pocket, rotated to a position exposing a new cutting edge and resetting the locking pin and retainer member 76. The indexing of the cutter inserts can be accomplished while another cutter body is at work on the hanger.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. A rotary cutting tool comprising a body having a central axis of rotation, a plurality of like cutting insert receiving pockets located at one end of said body, each of said pockets having a flat rear wall and a plurality of like side walls extending forwardly from said rear wall, a plurality of like cutting inserts each having parallel front and rear faces and a plurality of like symmetrically disposed side walls each having cutting edges respectively defined by the intersection of the side walls of the insert with the front face thereof, said side walls of each pocket being oriented to engage side walls of one of said inserts when the rear face of the insert is seated in face to face engagement with the rear wall of the pocket and to locate an unengaged cutting edge of said insert in a cutting position projected axially beyond said one end of said body, retaining means for detachably retaining each insert in the aforementioned seated relationship in the respective pocket, said inserts having a thickness between the front and rear faces thereof such that the plane of the front face of each insert is offset forwardly of said axis with respect to the direction of rotation of the body when the rear face of each insert is in face to face engagement with the rear wall of one of said pockets, wherein said respective unengaged cutting edge of each insert sweeps a common, coextensive spherical zone with respect to each other unengaged cutting edge, said spherical zone centered on the central axis of rotation of said body when said inserts are in said cutting position.

2. The invention defined in claim 1 wherein the cutting edges of the inserts when mounted on the body lie in respective planes parallel to the body axis which are angularly offset about said axis from each other by unequal angles.

3. The invention defined in claim 1 wherein said retaining means comprises locking pin means engaged between each insert and said body and a retainer member mounted on said body and engaged with the front face of each insert for clamping the insert against the rear face of the pocket in which it is located.

4. The invention defined in claim 3 wherein said retainer member comprises a plate like member having a threaded bore therethrough, an arm on said member extending radially into overlying relationship with the front face of one of said inserts in said pocket outwardly from said bore, and differential screw means mounted in said body at one side of said pocket and threadably received in said threaded bore in said member for clamping said arm against said front face.

5. The invention defined in claim 4 wherein said differential screw means includes a differential screw threadably received in a counterbore spaced from said pocket, and means defining an arm receiving slot in said body extending from said counterbore to said pocket for retaining said retainer member against rotation upon rotation of said differential screw.

6. A cutting tool comprising a body having a central axis of rotation, one end surface of said body having a plurality of like insert receiving recesses therein extending axially of said body from said one end, each of said recesses having a first wall, means defining a locking pin receiving bore extending into said body from the first wall of each recess along a secondary axis, a plurality of flat cutting inserts each having a central locking pin receiving bore therethrough and a periphery defined by a plurality of like convexly curved cutting edges symmetrically disposed about said central bore, said inserts lying in face to face engagement with the respective first walls of said recesses, locating means including a locking pin for each of said recesses for orienting said inserts rotatively relative to the respective secondary axes in like positions such that one cutting edge of each insert projects beyond said one end surface of said body and the respective one cutting edges of said inserts sweep a common, coextensive spherical zone centered upon said central axis upon rotation of said body about said central axis.

7. The invention defined in claim 6 wherein each of said cutting inserts has first and second flat faces, said first face being engageable with said first wall of said recess and said cutting edges being defined by the intersection of the peripheral side surfaces of said insert with said second face, said locating means including side walls of each of said recesses engageable with all side surfaces of the insert located therein other than the side surface defining said one cutting edge, each of said side walls having a relief recess therein intermediate its ends whereby a side surface of an insert engages a side wall of said recess along two spaced sections of said side wall.

8. The invention defined in claim 7 wherein two adjacent side surfaces of said insert engaged with adjacent side walls of said recess intersect each other at a corner edge of said insert, and means defining an enlargement of said recess adjacent said corner edge defining a relief clearance for the corner edge of an insert received in said recess.

9. In a rotary cutting tool for cutting a spherical seat on an interior surface of a workpiece having a relatively large opening extending along a first axis and at least one bore having a second axis aligned with a spherical seat location, hanger means for supporting said rotary cutting tool for movement along said first axis in and out of said large opening of said workpiece and for movement along said second axis to said spherical seat location when a central axis of said rotary cutting tool is aligned with said second axis, arbor means reciprocally extendable along said second axis through said at least one bore of said workpiece to operably engage said rotary cutting tool for axially displacing said rotary cutting tool from said first axis along said second axis to said spherical seat location and for rotatively driving said rotary cutting tool while cutting said spherical seat at said spherical seat location on an interior surface of said workpiece, and quick disconnect mounting means for connecting the rotary cutting tool to the hanger means while allowing rotation of the rotary cutting tool relative to the hanger means and while further allowing reciprocal driving engagement between the rotary cutting tool and the arbor means, the improvement of the rotary cutting tool comprising:

indexable cutter means for cutting said spherical seat during rotation of said cutter means about a central axis, the indexable cutter means including a body having said central axis of rotation, at least one end surface of said body having a plurality of like insert receiving recesses therein extending axially of said body from said at least one end, each of said recesses having a first wall lying in a general plane, a plurality of flat cutting inserts each having a central locking means receiving bore therethrough and a periphery defined by a plurality of like convexly curved cutting edges symmetrically disposed about said central bore, said inserts oriented rotatively relative to the central bore in like positions such that one cutting edge of each insert projects beyond said at least one end surface of said body and the respective one cutting edges of said inserts sweep a common, coextensive spherical zone centered on said central axis upon rotation of said body about said central axis and locking means for holding each insert in face to face engagement with the respective first walls of the recesses in which said inserts are received.

10. The rotary cutting tool of claim 9 wherein the cutting edges of the inserts when mounted on the body lie in respective planes angularly offset about said axis from each other by unequal angles.

11. The rotary cutting tool of claim 9 wherein said locking means comprises:
locking pin means passing through said central bore of each insert and engaged with said body.

12. The rotary cutting tool of claim 8 wherein said locking means further comprises:
a retainer member mounted on said body and engaged with the front face of each insert for clamping the insert against the rear face of the pocket.

13. The rotary cutting tool of claim 12 wherein said retainer member comprises:
a plate-like member having a threaded bore therethrough, an arm on said member extending radially into overlying relationship with the front face of one of said inserts in said pocket outwardly from said bore, and differential screw means mounted in said body at one side of said pocket and threadably received in said threaded bore in said member for clamping said arm against said front face.

14. The rotary cutting tool of claim 13 wherein said differential screw means includes a differential screw threadably received in a counterbore spaced from said pocket, and means defining an arm receiving slot in said body extending from said counterbore to said pocket for retaining said retainer member against rotation upon rotation of said differential screw.

15. The rotary cutting tool of claim 8 further comprising:
retaining means located adjacent each of said recesses in overlying engagement with respective inserts for retaining said inserts in face to face engagement with the respective first walls of the recesses in which said inserts are received.

16. The rotary cutting tool of claim 12 wherein said retaining means comprises means defining a tapped bore in said body adjacent each of said recesses having a bore axis parallel to said secondary axis, screw means threadably received in said tapped bore and having a projecting portion extending outwardly of said body, and a clamp member threadably received on said projecting portion of said screw means and extending laterally from said screw means into overlapping engagement with the cutting insert disposed in the adjacent recess.

17. The rotary cutting tool of claim 8 wherein each of said cutting inserts has first and second flat faces, said first face being engageable with said first wall of said recess and said cutting edges being defined by the intersection of the peripheral side surfaces of said insert with said second face, said locking means including side walls of each of said recesses engageable with all side surfaces of the insert located therein other than the side surface defining said one cutting edge, each of said side walls having a relief recess therein intermediate its ends whereby a side surface of an insert engages a side wall of said recess along two spaced sections of said side wall.

18. The rotary cutting tool of claim 17 wherein two adjacent side surfaces of said insert engaged with adjacent side walls of said recess intersect each other at a corner edge of said insert, and means defining an enlargement of said recess adjacent the corner edge defining a relief clearance for the corner edge of an insert received in said recess.

* * * * *

UNITED STATES PATENT AND TRADEMARK OFFICE
CERTIFICATE OF CORRECTION

PATENT NO. : 5,232,317
DATED : August 3, 1993
INVENTOR(S) : Bruce G. Peuterbaugh It is certified that error appears in the above-indentified patent and that said Letters Patent is hereby corrected as shown below:

```
Column 1, line 10, after "to" insert --a--.
Column 1, line 11, after "finish" insert --cutting--.
Column 6, line 7, delete "9".
Column 10, line 5, delete "8" and insert --9--.
Column 10, line 27, delete "8" and insert --9--.
Column 10, line 34, delete "12" and insert --15--.
Column 10, line 44, delete "8" and insert --9--.
```

Signed and Sealed this

Thirty-first Day of March, 1998

Attest:

BRUCE LEHMAN

*Attesting Officer*      *Commissioner of Patents and Trademarks*